Aug. 16, 1966  G. R. GRAFIUS  3,266,613
VIBRATORY BOWL WITH IMPROVED ESCAPEMENT
Filed Jan. 4, 1965  2 Sheets-Sheet 1
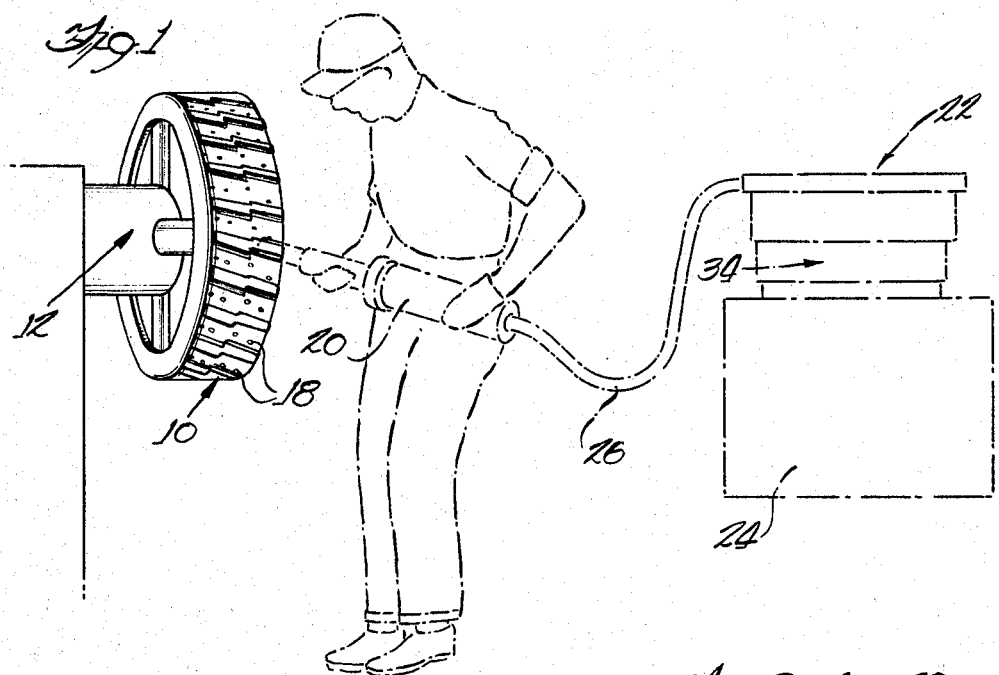
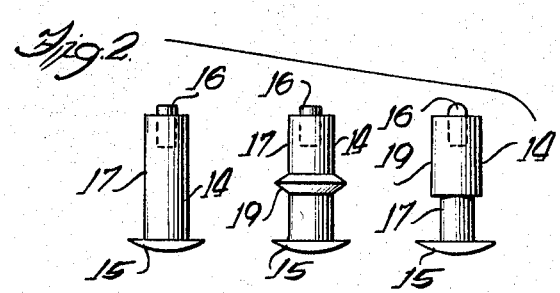
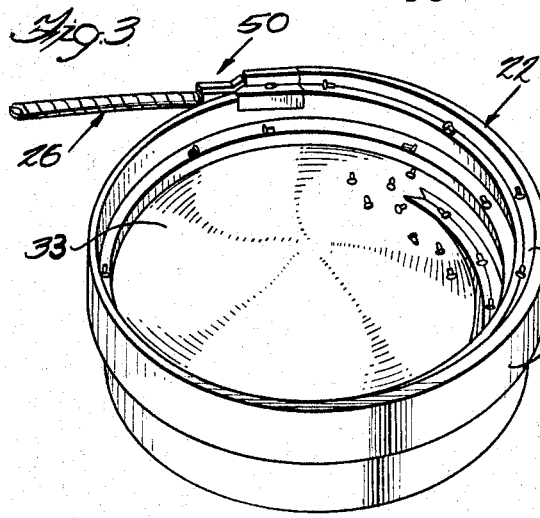
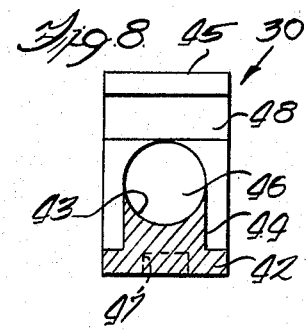
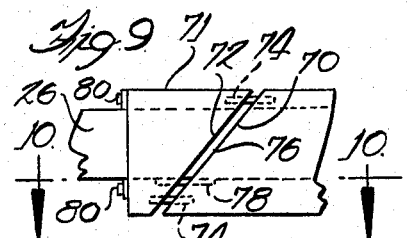
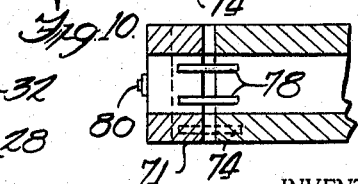
INVENTOR.
Gerald R. Grafius
BY
Dominik & Stein
Attorneys

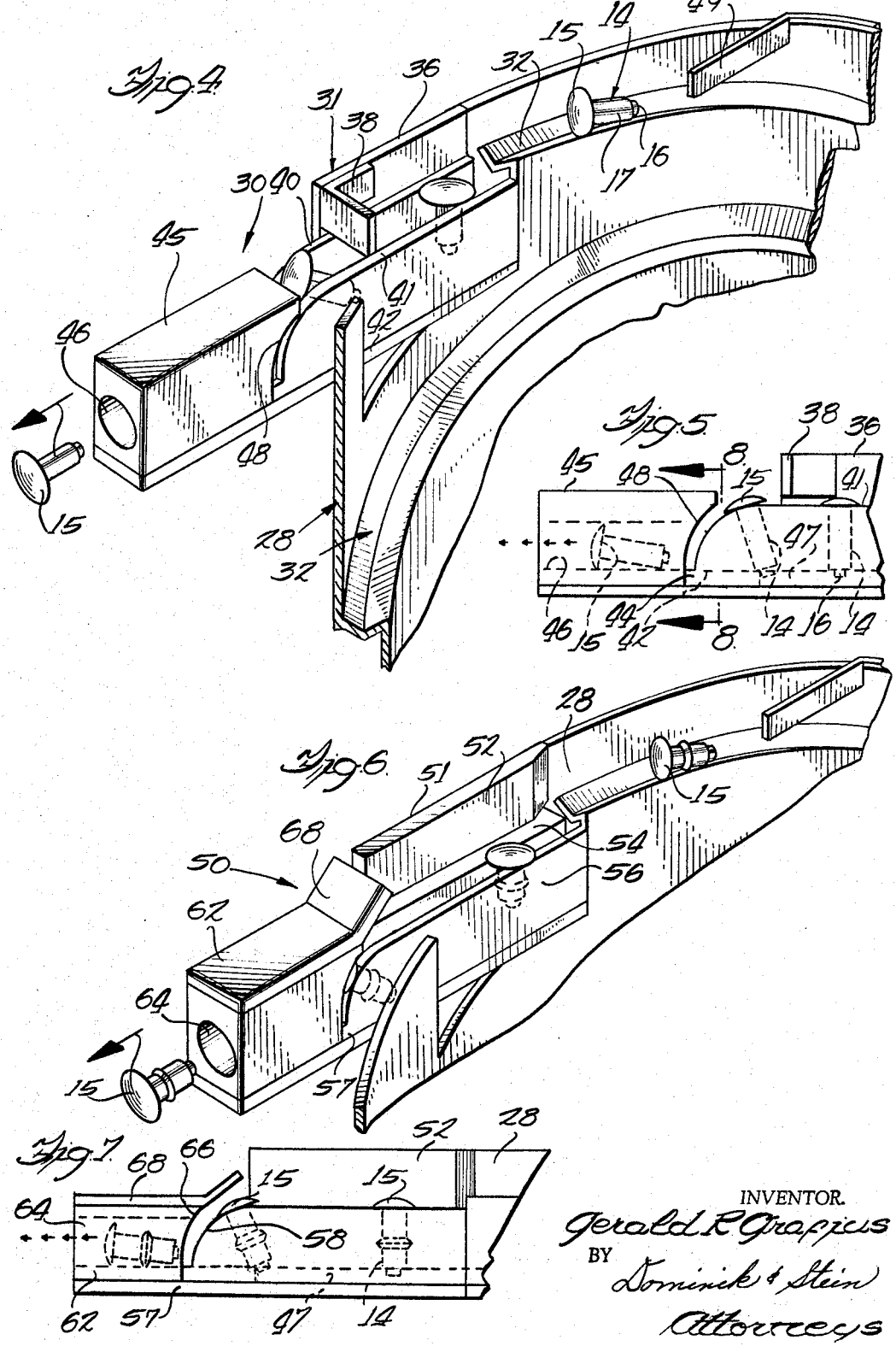

United States Patent Office 3,266,613
Patented August 16, 1966

3,266,613
VIBRATORY BOWL WITH IMPROVED ESCAPEMENT
Gerald R. Grafius, Erie, Pa., assignor to Automation Devices, Inc., Erie, Pa., a corporation of Pennsylvania
Filed Jan. 4, 1965, Ser. No. 423,123
10 Claims. (Cl. 198—33)

This invention relates to apparatus for orienting parts in a predetermined position and more particularly it relates to escapements for use with vibratory feeder bowls, for orienting the parts moved to their outlets, in a predetermined position.

Recently there has been devised a method of providing additional traction for vehicle tires, for improving the traction of the same in snow or in mud or on ice. The method contemplates inserting aluminum slugs having Carboloy tips into pre-formed holes in the peripheral edge of the tires, with the Carboloy tips projecting outwardly of the tires. The slugs are generally in the shape of a rivet, the head portion of which is embedded into the rubber tread of the tires. As many or as few of these slugs can be embedded into the tire, as desired.

In view of the fact it is contemplated that a large number of the slugs will necessarily be handled, it immediately becomes a problem to handle the slugs in a practical and an economical manner, so that the cost of inserting the slugs into the tires is not prohibitive, particularly to the local service station owner or to the small volume tire dealers who may be called upon for such service. In the process of installing the slugs, each of them must be properly oriented, with the head portion projecting toward the tire, and the head portion must be inserted into the hole formed in the tire. It would be particularly advantageous to be able to perform each of these operations automatically, hence substantially reducing the labor cost of the installation. The present invention is particularly applicable for performing the operation of orienting a multitude of the slugs in a head-first fashion, and feeding the same in a continuous, uninterrupted fashion to apparatus for inserting them into the holes in the tire.

At first impression, it appears that it is only necessary to adapt prior rivet handling and orienting apparatus to the present installation, and that it is therefore a relatively simple task to provide a "feeder" for the described system. However, in reviewing prior rivet handling and orienting apparatus it is immediately discovered that rivets are generally oriented, and feed, with the tail portion leading, so that it can be inserted in the holes in the parts to be riveted together and immediately peened to secure the parts together. The orienting apparatus orients the parts oppositely to the required orientation, that is, with the head portion leading. It is therefore evident that a completely new and different orienting apparatus is required. It is also apparent in reviewing the rivet handling and orienting apparatus that none of them provide a virtually "nonjamming" escapement mechanism.

It is therefore an object of the present invention to provide new and improved apparatus for orienting parts in a predetermined fashion. It is further contemplated that the apparatus will be virtually "nonjamming," so that a continuous, uninterrupted flow of parts is provided.

It is another object of the invention to provide new and improved apparatus for orienting parts which generally resemble rivets, in a head-first fashion.

It is still another object to provide an improved escapement for orienting parts in a predetermined orientation.

It is still another object to provide an improved escapement for use with vibratory feeder bowls, for orienting parts which generally resemble rivets, in a head-first fashion. In this respect, it is a further object to provide an improved escapement which is virtually "nonjamming."

It is a still further object to provide an improved escapement for orienting rivet-like parts in a head-first fashion, which is relatively inexpensive to manufacture and which is readily adaptable to existing vibratory feeder bowls.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a view illustrating the above described method of installing aluminum slugs into vehicle tires to improve their traction characteristics, using apparatus exemplary of the present invention;

FIGURE 2 is side plan views of various rivet-like parts which may be oriented, using the apparatus of the present invention;

FIGURE 3 is a top perspective view of a part of the vibratory feeder bowl of the present invention;

FIGURE 4 is a side perspective view of an escapement, according to a first embodiment of the invention;

FIGURE 5 is a side view of the escapement of FIG. 4;

FIGURE 6 is a side perspective view of an escapement, according to a second embodiment of the invention;

FIGURE 7 is a side view of the escapement of FIG. 6;

FIGURE 8 is a sectional view taken along line 8—8 in FIG. 5.

FIGURE 9 is a partial view of an end of one of the escapements, illustrating one method of securing a feeder tube thereto; and FIGURE 10 is a sectional view taken along line 10—10 in FIG. 9.

Referring now to the drawings, in FIG. 1 there is generally shown apparatus for installing aluminum slugs into holes formed in the tread of vehicle tires, so as to improve the traction characteristics of the tires. A tire 10 may be mounted in any convenient manner, as for example upon rotatable supporting frame 12, so that aluminum slugs 14 having Carboloy tips 16 (FIG. 2) may be embedded into holes 18 formed about the periphery of the tire, using an air gun 20 or the like.

As indicated above, the present invention is particularly applicable, but not limited, to orienting the slugs 14 in a head-first fashion, that is, with the head portion 15 thereof leading, and to feeding these parts to the air gun 20, in a continuous, uninterrupted fashion. Generally, the apparatus of the present invention comprises a vibratory feeder bowl 22 which may be mounted on a support stand 24 or the like. A hose 26, or feed line, is connected to the outlet, or escapement 30 or 50 (best seen in FIGS. 4–7), for feeding the oriented parts to the air gun 20. The vibratory feeder bowl 22 is supplied with a number of the slugs 14, all in various states of orientation, and delivers them to the escapement which aligns them in a head-first fashion. The parts are fed into the feed line 26 by the vibratory action of the feeder bowl 22.

Once the slugs enter the feed line 26, they are fed, by gravity, through the feed line to the air gun 20. If a more rapid feed is desired, compressed air, or other medium, may be used to propel the slugs through the feed line 26.

In FIG. 2 are shown a number of variously shaped slugs 14 which may be oriented in a head-first fashion, with the apparatus of the present invention. It is only necessary that the head portion 15 of the slugs be larger in diameter than the tail portion 17, or enlarged peripheral portions 19, so that the head-portion 15 will ride on a pair of rails, with the tail portion 17 hanging down between the rails, in a manner described more fully hereinafter. The slugs 14 are of aluminum and have Carboloy tips 16 for extending the lift of the slugs 14, when in use on a tire.

The vibratory feeder bowl 22 is of the type well known in the industry and may be generally described as comprising a bowl 28 which has a convex shaped bottom wall 33 and a spirally arranged track 32 formed about its interior periphery. In the disclosed embodiments, the track 32 is shown to be of V-shaped and of such a width that only a single line of parts can proceed up the track to the escapement at its end. With such an arrangement, in "walking" up the track 32, the parts, in this case rivet-like slugs 14, are prealigned in either a head-first or tail-first fashion before arriving at the escapement 30, or 50, at which point they are finally aligned in a head-first fashion and fed to the air gun 20 via the hose 26 coupled to the outlet of the escapement. It will be apparent from the description, however, that it is not necessary or essential to the operation of the apparatus of the present invention that the parts be presented to the escapement 30, or 50, in an end to end alignment, since those which are not in such an alignment will be rejected at that point. Therefore, a multiplicity of lines of parts can be fed to the escapement 30, or 50, and the parts need not be in an end to end alignment, but could lay at right angles to the line of feed. Enclosed within the cover 34 wrapped about the lower portion of the bowl 28 is the mechanism (not shown) for causing the bowl 28 to be vibrated to "walk" the parts up the spirally arranged track 32 to the outlet, or escapement 30, positioned at the end of the track 32. The mechanism, as well as the method in which this is accomplished, are both well known in the industry and are therefore not shown nor described.

In accordance with a first embodiment of the invention, the escapement 30 comprises an alignment member 31 having a side wall 36 which corresponds in height to the side wall of the bowl 28 and which has a ledge 40 formed on its interior side which, in conjunction with the top edge of a side wall 41 forms a pair of spaced apart rails (hereinafter referred to as rails 40 and 41) upon which the head portions 15 of the rivet-like slugs 14 will ride. The alignment member 31 also has a bottom wall 42 which extends a considerable distance beyond the ends of the rails 40 and 41 and upon which is mounted an enclosed member 45. An L-shaped wiper 38 is secured to the side wall 36, with one leg projecting outwardly over the rails 40 and 41, for spilling misaligned parts back into the bowl 28 or into alignment, with the head portions 15 thereof, riding on the rails 40 and 41. The ends of the rails 40 and 41 are curved and have a radius, which is defined more fully hereinafter, which assures that the slugs 14 are spilled in a head-first fashion. The enclosed member 45, mounted on the bottom wall 42 of the alignment member 31, has a tubular tunnel 46 (FIG. 8) formed therein which extends through its length and which substantially corresponds in size to the head portion 15 of the rivet-like slug 14.

The bottom wall 42 of the alignment member 31, as may be best seen in FIGS. 5 and 8, is formed with a centrally positioned upstanding portion 44 having a convex-shaped trough 43, the end of which is aligned with the entrance to the tubular tunnel 46. A groove 47 which is more fully defined hereinafter is formed in the bottom wall 42, centrally between the rails 40 and 41. The ends of the tail portions 17 of the slugs 14 engage the end of the groove 47 to hold the tail portions 17 while the head portion 15 advances, to initially start the spill of the slugs 14 at the ends of the rails 40 and 41. One end of the enclosed member 45 is formed with a curved end 48 having a radius which generally corresponds to the radius formed on the ends of the rails 40 and 41. Also, the height of the enclosed member 45 is such that the curved end 48 provides a shield which functions to maintain the center line of the slugs 14 aligned with the radius formed on the ends of the rails 40 and 41, in a manner described more fully hereinafter.

In operation, the slugs 14 are dumped, in mass, in the bowl 28 and are caused to travel up the spirally arranged track 32 formed about its periphery, in the manner well known in the art. During the travel up the track 32, the slugs 14, in this case, are prealigned in substantially a single line and in either a head-first or tail-first fashion, due to the track configuration and by means of various alignment elements such as the wiper 49 (FIG. 4) which engages the slugs to wipe any of those which are overlapped back into the bowl before arriving at the escapement 30, positioned at the end of the track 32. The slugs 14 are spilled, either head-first or tail-first, onto the rails 40 and 41 of the alignment member 31 of the escapement 30. In spilling off of the track 32 onto the rails 40 and 41, a number of the slugs 14 may be spilled back into the bowl 28 but the majority of them drop onto the rails 40 and 41. The counterbalancing weight of the tail portions 17 thereof will cause the tail portions 17 to drop downwardly between the rails 40 and 41 with the head portion 15 thereof resting, or riding, on the rails 40 and 41. In the event the head portion 15 of one of the slugs 14 rides on top of the head portion 15 of another one of the slugs 14, the L-shaped wiper 38 will either engage the head portion 15 of the one slug 14 and properly position it, or else it will prevent the two slugs 14 from advancing until both are properly positioned with the head portions of each riding on the rails 40 and 41. The slugs 14 continue to advance, with their head portions 15 riding on the rails 40 and 41, to the ends of the rails 40 and 41 at which time they are caused to spill head-first to the trough 43 formed in the bottom wall 42 by the action of the radius formed at their ends.

In cases where a multiplicity of lines of parts are simultaneously fed to the escapement 30, or when the parts are not prealigned in end to end fashion, the L-shaped wiper 38 rejects the parts which do not properly align themselves between the rails 40 and 41 back into the bowl. The L-shaped wiper 38 therefore both rejects those parts which are laying crossways on the rails 40 and 41, and also those parts which are riding with the head portion 15 atop the rails 40 and 41 and the tail portion thereof resting on the head portion of the part following.

In order to assure that the slugs 14 will spill head-first, it has been determined that there must be a predetermined relationship between the size of the parts, the position of the end of the groove 47 with respect to the point of tangency of the radius with the rails 40 and 41 and the size of the radius itself. In this regard, the radius formed on the ends of the rails 40 and 41 must tangentially intersect the top of the rails 40 and 41 at a point perpendicular to the end of the groove 47, as at point $a$, and the radius must be such that head portions 15 of the slugs 14 will ride on the rails 40 and 41, that is, will follow the curvalinear path defined by the radius, rather than free-falling, into the trough 43. The ends of the slugs 14 engage the end of the groove 47 and, to some degree, are restrained so that the head portions 15 of the slugs are slidably held against the rails 40 and 41, to follow curvature of the radius formed on their ends. The radius therefore should be such that the ends of the slugs will engage the end of the groove 47 while the head portions 15 are sliding on the ends of the rails 40 and 41. It may also be noted that the tail portion 17 of the slug which follows abuts against the tail portion 17 of the slug engaged with the end of the groove 47 to, in some degree, restrain its movement, and hence assist in providing the described mode of operation. When so related, it is found that the slugs 14 will always spill head-first and that a virtually "non-jamming" operation is provided.

During the spilling of the slugs 14, the curved portion or shield 48 of the enclosed member 45 functions to maintain the centerline of the parts aligned with the radius on the ends of the rails 40 and 41. After being spilled so that the head portion 15 of the slugs 14 rests on the bottom wall 42, the slugs are advanced through the tunnel 46 formed in the enclosed member 45, to the hose or feeder tube 26 (not shown) secured to its end, as illustrated in FIG. 1.

Referring now to FIGS. 6 and 7, an escapement 50 constructed in accordance with a second embodiment of the invention is shown secured to the vibratory feeder bowl 22. The escapement 50 generally corresponds to the escapement 30 and has an alignment member 51 having a side wall 52 which corresponds in height to the wall of the bowl 28 and has a ledge 54 on its interior surface which forms in conjunction with the top edge of a side wall 56 a pair of spaced apart rails (hereinafter referred to as rails 54 and 56) upon which the head portion 15 of the rivet-like slugs 14 can ride. The ends of the rails 54 and 56 are formed with a radius 58, which corresponds to the radius on the rails 40 and 41 of the escapement 30.

The alignment member 51 also has a bottom wall 57 which extends outwardly beyond the ends of the rails 54 and 56; which bottom wall may have a centrally positioned upstanding portion 44 having a convex-shaped trough 43 and a groove 47 formed therein, for causing the initial spilling of the slugs 14, in the manner previously described.

Secured to the bottom wall 57 is an enclosed member 62 having a tubular tunnel 64 which substantially corresponds in size with the diameter of the head portion 15 of the slugs 14 and which extends through its length. Also, the end nearest the ends of the rails 54 and 56 is similarly formed with a radius 66, which corresponds to the radius 48, and the top member 68 thereof is extended and angled upwardly so as to provide both a shield and a wiper, which is equivalent to and functions in the same manner as the L-shaped wiper 38 of the escapement 30.

In operation, the escapement 50 functions in the same manner as the escapement 30. The slugs 14, after being caused to travel up and to the end of the track 32 formed about the periphery of the bowl 28, are spilled onto the rails 54 and 56, in the manner previously described. Upon spilling onto the rails 54 and 56, a number of them will be spilled back into the bowl 28, but the majority of them will be aligned, due to the counterbalance of the tail portion 17, with the head portion 15 resting, or riding, on the rails 54 and 56 and the tail portion 17 hanging down between them.

The upwardly angled end of the top member 68 functions as the L-shaped wiper 38, to prevent more than one slug 14 from advancing to the spill area, by engaging the head portion 15 of the slugs 14 and either wiping one free of the other or retaining them until the one is vibrated free of the other, with the head portion of each resting on the rails 54 and 56.

When the slugs 14 reach the ends of the rails 54 and 56, they are caused to spill head-first by the action of the groove 47 and the predefined radius 58, to the trough 43 in the bottom wall 57, in the manner previously described. In spilling, the centerline of the slugs 14 are maintained in alignment with the radius 58 on the ends of the rails 54 and 56, by the action of the radius 66 formed on the end of the enclosed member 62. The slugs 14 thereafter pass through the tubular tunnel 64 formed in the enclosed member 62, to the tube or feeder line 26 secured to its end and thence to the air gun 20. The installer by operating the air gun 20 can embed the head portion 15 of the slugs 14 into the holes 18 formed in the periphery of the tire 10.

In FIGS. 9 and 10 are shown one manner in which the ends of the enclosed members 45 and 62 may be formed so that the slugs 14 will freely flow from the end thereof into the feed line 26. The end of the enclosed member is formed with a downwardly tapered surface 70 which is adapted to mate with a corresponding oppositely tapered surface 72 formed on a connector member 71. The connector member 71 has a tubular tunnel 79 formed therein which corresponds in size with the tunnels 46 and 64 and is secured to the end of the enclosed member by means of pins 74 which are of such length that when secured within apertures formed in each of the two members holds them in spaced relation so as to permit the slugs to pass thereto and to provide an air gap 76 therebetween. The pins 74 are preferably flexible, to some degree, so that, in combination with the air gap, the vibratory action of the feeder bowl 22 is not damped. A pair of pins 78 secured within recesses formed in the bottom portion of the wall of the tubular tunnels 79 and 43 or 64 permit the slugs to bridge the air gap 76, without the head portion 15 of the slugs 14 dropping into and hence being restrained therein. The feed line 26 is aligned and secured to the connector member 71 by means of fastener means, such as the threaded screws 80.

In the event the feed line 26 is a plastic tube, or other similar lightweight material, it can under most circumstances be connected directly to the end of the enclosed members without damping the operation of the feeder bowl 22.

In one particular application, wherein rivet-like slugs 14 having an overall length of $19/32''$, measured from the underside of the head portion to the end of the Carboloy tip, a head diameter of .314'' and a body diameter of .200'' were used, the overall length of the rails 40 and 41, or 54 and 56, measure $27/16''$ and a radius of $7/16''$ was formed on the ends thereof, which radius tangentially intersected the top of the rails at a point perpendicular to the end of the groove 47 formed in the bottom wall of the escapement. Accordingly, the groove 47 extended approximately 2'' from the end of the escapement and had a width of $7/32''$ and a depth of $5/64''$. The overall height of the escapement measured $3/4''$ and its width measured $3/8''$, with a rail thickness of $1/32''$, hence leaving a spacing between the rails of $5/16''$.

On offset of $1/16''$, having a height of $3/16''$, was formed on the end of the rails at their lower ends, to form an abutment against which the enclosed member 45 was seated. The radius formed on the end of the enclosed members approximated $1/2''$, hence a spacing which measures slightly greater than $1/16''$ wase provided between the ends of the rails and the end of the enclosed member. The tunnel formed in the enclosed member measured $11/32''$ in diameter.

In review, it may be seen that the apparatus of the present invention is adaptable to position parts other than the disclosed rivet-like slugs 14. It is only necessary that the head portions thereof be sufficientlly large to ride on the rails of the alignment members, with the tail portions hanging down between the rails. To provide virtually non-jamming operation, the radius formed on the ends of the rails and the end of the groove must be formed having the relationship described, so that the parts spill properly. Also, a wiper upwardly angled surface should be provided, to prevent more than one part from entering the spill area simultaneously. A surface having a corresponding radius formed thereon should also be spaced from the ends of the rails, to maintain the centerline of the parts in alignment with the radius on the ends of the rails.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A vibratory feeder for aligning in a predetermined position parts having a head portion and a tail portion, said head portion being substantially larger than said tail portion, comprising, in combination: a vibratory feeder bowl having a spirally arranged track about the interior periphery of its side walls, said bowl being adapted to be vibrated to cause said parts to travel up said track, an escapement positioned at the end of said track for aligning said parts in a head-first fashion, said escapement including a bottom wall, spill means formed in said bottom wall, rail means spaced apart so that said head portions ride on said rails with said tail portion handing down between said rails, the ends of said rails being formed with a radius which tangentially intersects said rails at a point perpendicular to said spill means and which is of such size that the head portions of said parts engage the ends of said rails with the tail portions thereof engaged with said spill means.

2. A vibratory feeder for aligning in a predetermined position parts having a head portion and a tail portion, said head portion being substantially larger than said tail portion, comprising, in combination: a vibratory feeder bowl having a spirally arranged track about the interior periphery of its side walls, said bowl being adapted to be vibrated to cause said parts to travel up said track, an escapement positioned at the end of said track for aligning said parts in a head-first fashion, said escapement including a bottom wall, spill means formed in said bottom wall, rail means spaced apart so that head portions ride on said rails with said tail portions hanging down between said rails, the ends of said rails being formed with a radius which tangentially intersects said rails at a point perpendicular to said spill means and which is of such size that the head portions of said parts engage the ends of said rails with the tail portions thereof engaged with said spill means, and a member positioned adjacent the ends of said rails having a radius which substantially corresponds to said radius formed on the ends of the said rails formed on the end thereof which is adjacent said rails.

3. A vibratory feeder for aligning in a predetermined position parts having a head portion and a tail portion, said head portion being substantially larger than said tail portion, comprising, in combination: a vibratory feeder bowl having a spirally arranged track about the interior periphery of its side walls, said bowl being adapted to be vibrated to cause said parts to travel up said track, an escapement at the end of said track for aligning said parts in a head-first fashion, said escapement including a bottom wall, spill means formed in said bottom wall, rail means spaced apart so that said head portions ride on said rails with said tail portion hanging down between said rails, the ends of said rails being formed with a radius which tangentially intersects said rails at a point perpendicular to said spill means and which is of such size that the head portions of said parts engage the ends of said rails with the tail portions thereof engaged with said spill means, and an enclosed member positioned adjacent the ends of said rails having a tunnel formed therein which substantially corresponds to the size of said head portions and a radius which substantially corresponds to said radius formed on the ends of said rails formed on the end thereof which is adjacent said rails, said parts after being spilled head-first passing through said tunnel in said enclosed member.

4. A vibratory feeder for aligning in a predetermined position parts having a head portion and a tail portion, said head portion being substantially larger than said tail portion, comprising, in combination: a vibratory feeder bowl having a spirally arranged track about the interior periphery of its side walls, said bowl being adapted to be vibrated to cause said parts to travel up said track, an escapement positioned at the end of said track for aligning said parts in a head-first fashion, said escapement including a bottom wall, spill means formed in said bottom wall, rail means spaced apart so that said head portions ride on said rails with said tail portion hanging down between said rails, the ends of said rails being formed with a radius which tangentially intersects said rails at a point perpendicular to said spill means and which is of such size that the head portions of said parts engage the ends of said rails with the tail portions thereof engaged with said spill means, L-shaped wiper means having one leg positioned over said rails in spaced relation thereto for permitting only parts which are aligned with said tail portions thereof hanging down between said rails, to advance to the ends of said rails, and an enclosed member positioned adjacent the ends of said rails having a tunnel formed therein which substantially corresponds to the size of said head portions and a radius which substantially corresponds to said radius formed on the ends of said rails formed on the end thereof which is adjacent said rails, said parts after being spilled head-first passing through said enclosed member.

5. A vibratory feeder for aligning in a predetermined position parts having a head portion and a tail portion, said head portion being substantially larger than said tail portion, comprising, in combination: a vibratory feeder bowl having a spirally arranged track about the interior periphery of its side walls, said bowl being adapted to be vibrated to cause said parts to travel up said track, an escapement positioned at the end of said track for aligning said parts in a head-first fashion, said escapement including a bottom wall, spill means formed in said bottom wall, rail means spaced apart so that said head portions ride on said rails with said tail portions hanging down between said rails, the ends of said rails being formed with a radius which tangentially intersects said rails at a point perpendicular to said spill means and which is of such size that the head portions of said parts engage the ends of said rails with the tail portions thereof engaged with said spill means, and a member positioned adjacent the ends of said rails having a top wall which is extended over the ends of said rails and angled upwardly so as to engage said head portions to permit only parts which are aligned with said tail portions thereof hanging down between said rails to advance to the ends of said rails, and a radius which substantially corresponds to said radius formed on the ends of said rails formed on the end of said member which is adjacent said rails.

6. A vibratory feeder for aligning in a predetermined position parts having a head portion and a tail portion, said head portion being substantially larger than said tail portion, comprising, in combination: a vibratory feeder bowl having a spirally arranged track about the interior periphery of its side walls, said bowl being adapted to be vibrated to cause said parts to travel up said track and to pre-align said parts in substantially a single line and in either a head-first or tail-first fashion, an escapement positioned at the end of said track for aligning said parts in a head-first fashion, said escapement including a bottom wall, spill means in the form of a groove formed in said bottom wall, rail means spaced apart so that said head portions ride on said rails with said tail portions hanging down between said rails, the ends of said rails being formed with a radius which tangentially intersects said rails at a point perpendicular to the end of said groove and which is of such size that the head portions of said parts engage the ends of said rails with the tail portions thereof engaged with the end of said groove, and an enclosed member positioned adjacent the ends of said rails having a tunnel formed therein which substantially corresponds to the size of said head portions and a radius which substantially corresponds to said radius formed on the ends of said rails formed on the end thereof which is adjacent said rails, said parts after being spilled head-first passing through said tunnel in said enclosed member.

7. An escapement for a vibratory feeder for aligning in a predetermined position parts having a head portion and a tail portion, said head portion being substantially larger than said tail portion, comprising a bottom wall, spill means formed in said bottom wall, rail means spaced apart so that said head portions ride on said rails with said tail portions hanging down between said rails, the ends of said rails being formed with a radius which tangentially intersects said rails at a point perpendicular to said spill means and which is of such size that the head portions of said parts engage the ends of said rails with the tail portions thereof engaged with said spill means, means in spaced relation to said rails for permitting only parts which are aligned with said tail portions thereof hanging down between said rails to advance to the ends of said rails, and a member positioned adjacent the ends of said rails having a radius which substantially corresponds to said radius formed on the ends of said rails formed on the end thereof which is adjacent said rails.

8. An escapement for a vibratory feeder for aligning in a predetermined position parts having a head portion and a tail portion, said head portion being substantially larger than said tail portion, comprising a bottom wall, spill means in the form of a groove formed in said bottom wall, rail means spaced apart so that said head portions ride on said rails with said tail portions hanging down between said rails, the ends of said rails being formed with a radius which tangentially intersects said rails at a point perpendicular to the end of said groove and which is of such size that the head portions of said parts engage the ends of said rails with the tail portions thereof engaged with the end of said groove, means in spaced relation to said rails for permitting only parts which are aligned with said tail portions thereof hanging down between said rails to advance to the ends of said rails, and a member positioned adjacent the ends of said rails having a radius which substantially corresponds to said radius formed on the ends of said rails joined on the end thereof which is adjacent said rails, said parts being spilled head-first passing through said member.

9. An escapement for a vibratory feeder for aligning in a predetermined position parts having a head portion and a tail portion, said head portion being substantially larger than said tail portion, comprising a bottom wall, spill means in the form of a groove formed in said bottom wall, rail means spaced apart so that said head portions ride on said rails with said tail portions hanging down between said rails, the ends of said rails being formed with a radius which tangentially intersects said rails at a point prependicular to the end of said groove and which is of such size that the head portions of said parts engage the ends of said rails with the tail portions thereof engaged with the end of said groove and a member positioned adjacent the ends of said rails having a top wall which is extended over the ends of said rails and angled upwardly so as to engage said head portions to permit only parts which are aligned with said tail portions thereof hanging down between said rails to advance the ends of said rails and a radius which substantially corresponds to said radius formed on the ends of said rails formed on the end thereof which is adjacent said rails.

10. An escapement for a vibratory feeder for aligning in a predetermined position parts having a head portion and a tail portion, said head portion being substantially larger than said tail portion, comprising a bottom wall, spill means in the form of a groove formed in said bottom wall, rail means spaced apart so that said head portions ride on said rails with said tail portions hanging down between said rails, the ends of said rails being formed with a radius which tangentially intersects said rails at a point perpendicular to the end of said groove and which is of such size that the head portions of said parts engage the ends of said rails with the tail portions thereof engaged with the end of said groove, and an enclosed member positioned adjacent the ends of said rails having a tunnel formed therein which substantially corresponds to the size of said head portions, a top wall which is extended over the ends of said rails and angled upwardly so as to engage said head portions to permit only parts which are aligned with said tail portions thereof hanging down between said rails to advance to the ends of said rails and a radius which substantially corresponds to said radius formed on the ends of said rails formed on the end thereof which is adjacent said rails, said parts after being spilled head-first passing through said tunnel in said enclosed member.

References Cited by the Examiner

UNITED STATES PATENTS 2,781,885 2/1957 Taylor.
2,872,019 2/1959 Owen.
3,034,633 5/1962 Clifford et al.

EVON C. BLUNK, *Primary Examiner.*

R. E. KRISHER, *Assistant Examiner.*